United States Patent [19]

Feichtinger et al.

[11] 4,213,439

[45] Jul. 22, 1980

[54] INTERNAL COMBUSTION ENGINE

[75] Inventors: Gerhard Feichtinger; Othmar Skatsche, both of Graz, Austria; Hans List, 126,Heinrichstrasse, Graz, Austria

[73] Assignee: Hans List, Graz, Austria

[21] Appl. No.: 961,412

[22] Filed: Nov. 16, 1978

[30] Foreign Application Priority Data

Nov. 22, 1977 [AT] Austria ................................ 8367/77

[51] Int. Cl.[2] ................................................ F16M 1/02

[52] U.S. Cl. ............................ 123/195 S; 123/198 E; 123/DIG. 6

[58] Field of Search ............ 123/198 E, 195 C, 195 S, 123/DIG. 1, DIG. 6, DIG. 7; 187/204

[56] References Cited

U.S. PATENT DOCUMENTS

| | | | |
|---|---|---|---|
| 2,945,715 | 7/1960 | Burrell | 123/195 C |
| 2,963,009 | 12/1960 | Dolza | 123/198 E |
| 3,863,617 | 2/1975 | Thien et al. | 123/198 E |
| 3,924,597 | 12/1975 | Hatz et al. | 123/198 E |
| 3,963,602 | 9/1972 | Thien et al. | 123/195 C |
| 4,071,008 | 1/1978 | Skatsche | 123/198 E |

*Primary Examiner*—Ira S. Lazarus
*Attorney, Agent, or Firm*—Watson, Cole, Grindle & Watson

[57] ABSTRACT

An internal combustion engine comprises an engine unit support which contains the engine parts directly affected by body resonance (cylinderhead, cylinder, piston, connecting rod, crankshaft main bearing, and crankshaft) and a crankcase connected to the engine unit support by flanges located above the crankshaft. The crankshaft main bearings consist of bearing blocks and bearing caps which are connectable to main bearing units independently from the main bearing bolts. The bearing units are detachably secured to the engine unit support. The crankcase is provided with at least one aperture closed by at least one cover part below the crankshaft, said apertures providing access to the main bearing bolts. Dismounting of the engine unit support is enabled with the crankshaft and the main bearing units mounted thereon remaining in the crankcase and the crankcase remaining mounted on its place, for instance in a vehicle.

5 Claims, 3 Drawing Figures

INTERNAL COMBUSTION ENGINE

BACKGROUND OF THE INVENTION

This invention relates to an internal combustion engine comprising an engine unit support which contains the engine parts directly affected by body resonance and sound vibration, namely cylinderhead, cylinder, piston, connecting rod, crankshaft main bearings, and crankshaft, and a crankcase cast integral with the flywheel housing. The crankcase is connected to the engine unit support on flanges located above the crankshaft. The crankshaft main bearings consist each of a bearing block and a bearing cap forming a main bearing unit detachably secured to the engine unit support.

DESCRIPTION OF THE PRIOR ART

Efforts to lower the noise level of internal combustion engines, especially for use in vehicles, with an engine construction of the type identified above is described in the DE-OS No. 2638009 wherein considerable improvements were achieved. In this known embodiment the power-leading engine structure directly affected by body resonance is acoustically divided from the crankcase which is mainly responsible for noise emission. In the sense of efficient weight lowering and reduction of production costs at the known embodiment the cylinder and the cylinderhead were cast integral and the crankcase was closed at its bottom. As a very disadvantageous result, however the entire engine has to be dismounted from the vehicle to carry out repairs, for instance for a so-called cylinderhead-service. Access to the pistons, the valves and the valve seats was not possible before further removing the engine unit support together with the crankshaft mounted thereon from the crankcase and dismounting of the crankshaft. For instance, to lapp-in new valves with the known construction dismounting and entire disassembling o the engine was unavoidable with the result of disproportionate high repair costs and long down time of the vehicle.

From the German Patent Specification No. 923,580 it is known to provide crankshaft main bearing units which consist of bearing blocks and bearing caps and which are detachably secured to the main bearing supporting walls. This construction enables assembly and disassembly of the crankshaft which is inserted into the crankscase in the tunnel-type construction manner. However, dismounting of the cylinder with cylinderhead from the crankcase is not enabled and not intended by this embodiment.

SUMMARY OF THE INVENTION

It is the aim of this invention to improve an internal combustion engine of the kind referred to at the beginning so that, similar to conventional engines, dismounting of the cylinderhead-cylinder-unit is possible with the crankcase remaining in the vehicle and the crankshaft remaining in the crankcase.

The present invention consists in that the bearing blocks and bearing caps are connectable to form the main bearings units independently from the main bearing bolts, and that the crankcase is provided with an aperture below the crankshaft which is closed by at least one detachable cover part providing access to the main bearing bolts. The bearing blocks and the bearing caps may be connected to the main bearing units by means of mounting screws, and the detachable cover part below the crankshaft may be an oil pan. This construction enables the removal of the engine unit support from the crankshaft in a short time. After removing the cover part or parts at the bottom of the crankcase and loosening of the main bearing bolts and the connecting screws at the flanges of the engine unit support and the upper rim of the crankcase, the engine unit support can be lifted out of the crankcase whereby the crankshaft, the crankshaft main bearing units on the crankshaft, the connecting rods, and the pistons remain in the crankcase which itself remains mounted in the vehicle. Now the cylinderhead-cylinder-unit is ready for repair or service work and the pistons are well accessible in the crankcase.

The use of mounting screws to connect the main bearing blocks and the main bearing caps advantageously ensures that the bearing blocks and caps do not fall apart when lifting off the engine unit support. They remain on the crankshaft as a unit and thus re-assembling after, for instance, a cylinder-head service is essentially simplified.

According to another embodiment of the invention the crankcase is provided at the side of the flywheel with an assembly aperture for the crankshaft and the main bearing units mounted thereon, and a joint plane is provided below the assembly aperture for the attachment of the oil pan. The diameter of the assembly aperture is just enough to enable insertion of the crankshaft together with the main bearing units premounted thereon into the crankcase. Pre-mounting of the main bearing units outside the crankcase considerably simplifies this work and saves time. The arrangement of the joint plane underneath the assembly aperture gives the crankcase more rigidity than the conventional arrangement in the plane of the crankshaft axis. Besides this essential advantage, oil sealing problems which often arise at joint planes in the plane of the crankshaft axis, also are avoided due to the fact that for attachment of the oil pan only a single continuous sealing surface which can be easily machined is provided.

According to a further embodiment of the invention the crankcase is connected to the engine unit support by means of at least one resonance-absorbing elastic member and in the region of the main bearing caps on both sides of the engine unit support at least one elastic supporting element is detachably and adjustably secured to the crankcase. The supporting elements are connected to a bunch provided at each side of the main bearing cap and the bunches lie within the assembly aperture as seen in the direction of the crankshaft axis. By the interposition of a resonance-absorbing element between the engine unit support and the crankcase, very effective sound reduction is obtained. The arrangement of the lateral elastic supporting elements enables, in the sense of optimal sound reduction, the use of a very soft resonance-absorbing element because the supporting elements prevent the engine unit support from making undue movements relative to the crankcase, for instance when the engine runs through the resonance speed. According to the invention the supporting elements are detachably connected to the respective bunches at the main bearing cap, so the aforedescribed advantageous possibility of assembling the crankshaft together with the pre-mounted main bearing units is maintained and simultaneously optimal sound reduction is obtained.

DESCRIPTION OF THE DRAWINGS

The present invention will be hereinafter more specifically explained with reference to an exemplary embodiment depicted in the accompanying drawings wherein.

DESCRIPTION OF THE PREFERRED EMBODIMENT

Figure 1:
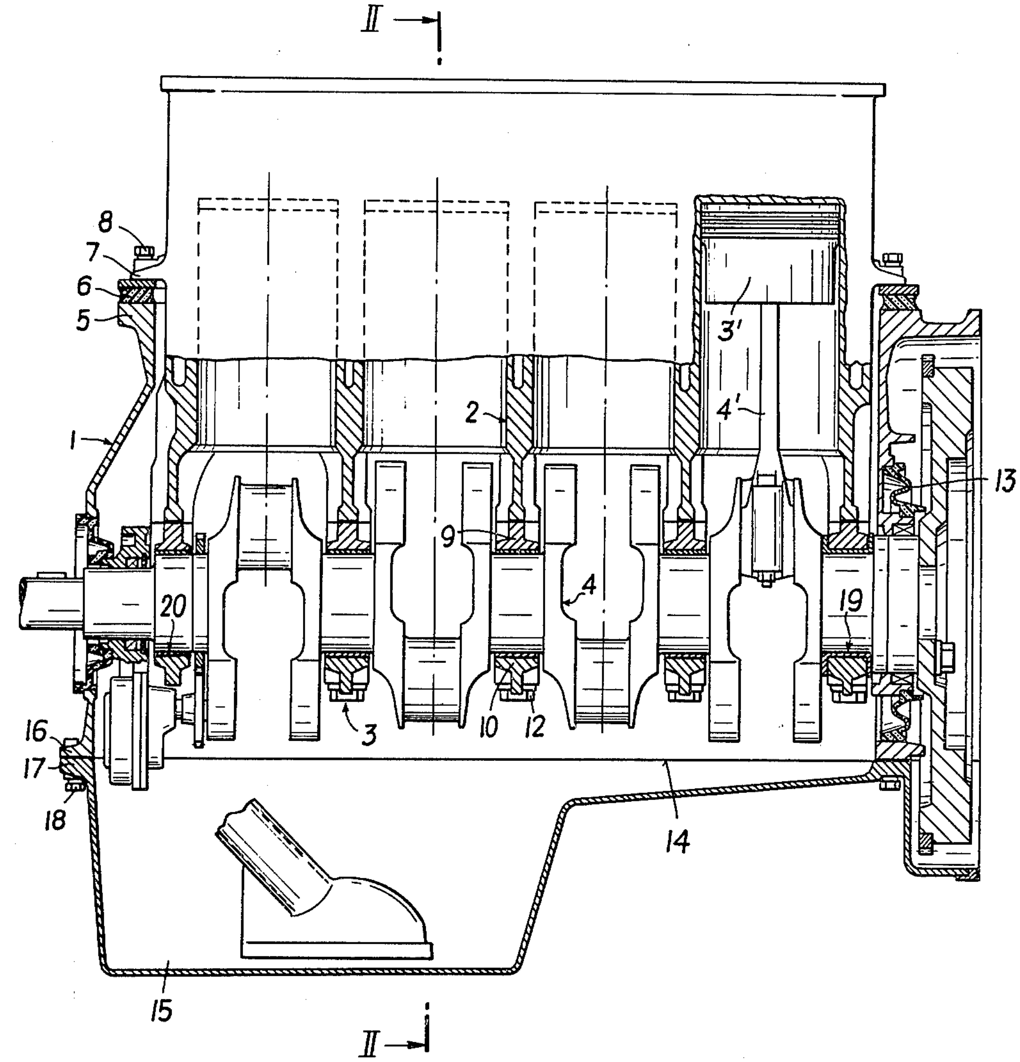
FIG. 1 is a longitudinal section of an engine according to the invention.
Figure 2:
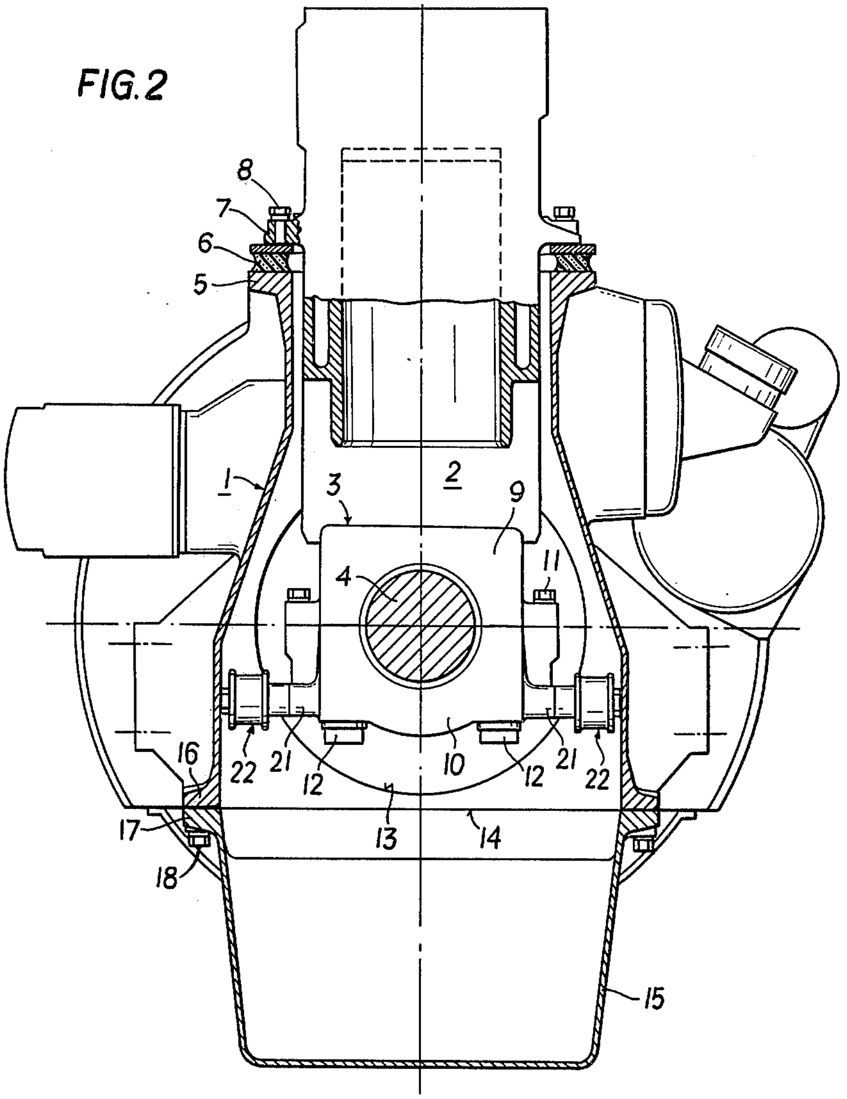
FIG. 2 is a cross section on the line II—II of FIG. 1.

The internal combustion comprises a crankcase 1, an engine unit support 2 with crankshaft main bearing units 3 mounted thereon in which a crankshaft 4 is supported. On its upper rim the crankcase 1 is provided with a continuous flange 5 to which a frame-like resonance-absorbing element 6 is secured. Attachment of the resonance-absorbing element 6 is made by means of an adhesive, however, also screw connection is possible. The engine unit support 2 is connected by screws 8 to the resonance-absorbing element 6 by means of a corresponding flange 7.

The crankshaft main bearing units 3 comprise a main bearing block 9 which directly rests on the engine unit support 2 and a main bearing cap 10. Both bearing parts are kept together by mounting screws 11, thus the main bearing units 3 may be pre-mounted on the crankshaft 4 without use of the main bearing bolts 12. The main bearing bolts 12 serve to secure the main bearing units 3 to the engine unit support and for power transmission from pistons 3' (FIG. 1), connecting rods 4', and crankshaft 4 over the main bearing caps 10 to the engine unit support 2. Access to the main bearing bolts and to the connecting rod bolts (not shown) is enabled by a division of the crankcase in a plane underneath the crankshaft assembly aperture 13. In the joint plane 14 the crankcase 1 and the oil pan 15 are provided with flanges 16 and 17 which serve to attach the oil pan 15 to the crankcase 1 by screws 18.

The bearing caps of the flywheel-sided crankshaft main bearing 19 and the main bearing 20 at the opposite end of the crankshaft 4 are each provided with lateral bunches 21 to each of which an elastic supporting element 22 is connected. The bunches 21 are dimensioned to lie within the diameter of the assembly aperture 13 as seen in the direction of the crankshaft axis. Thus, insertion into and removal of the crankshaft 4 from the crankcase 1, also together with the main bearing units 3 pre-mounted thereon, is possible.

Figure 3:
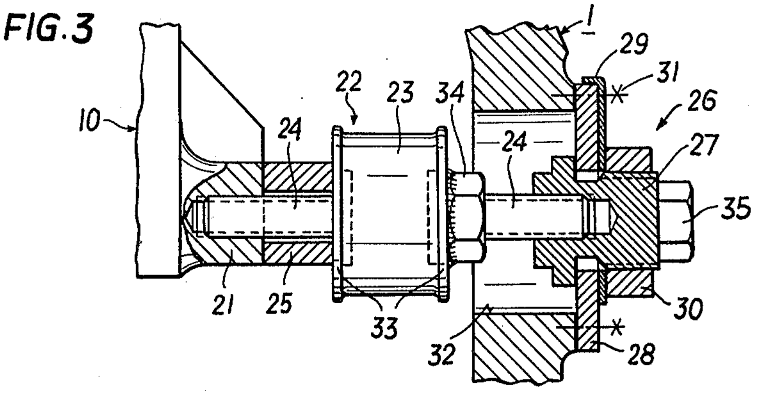
FIG. 3 is a detail of FIG. 2 on a larger scale.

FIG. 3 shows on a large scale the construction of the elastic supporting element 22 and the connection of it to the crankcase 1 and the bunch 21 of the main bearing cap 10. The rubber member 23 is provided with threaded pins 24 on both sides. The one pin is screwed into the bunch 21 of the bearing cap 10, with a spacer 25 being interposed. The other pin is screwed into an adjusting device 26 comprising adjusting screw 27, holding plate 28, locking plate 29, and lock nut 30, and being secured to the crankcase 1 by screws, indicated by their axes 31. After removal of the adjusting device 26, the rubber member 23 may be dismounted through an aperture 32 in the crankcase 2 by means of a nut 34 provided at one of the metal plates 33 of the rubber member 23. Adjustment an tensioning of the elastic supporting element 22 is made by means of the adjusting screw 27 which is provided with a hexagon head 35. The lock nut 30 and the locking plate 29 serve to fix the made adjustment.

We claim:

1. An internal combustion engine comprising an engine unit support which contains the engine parts directly affected by body resonance and sound vibration, namely cylinderhead, cylinder, piston, connecting rod, crankshaft main bearings, and crankshaft, and a crankcase cast integral with the flywheel housing and connected to the engine unit support on flanges located above the crankshaft, the crankshaft main bearings each consisting of a bearing block and a bearing cap forming a main bearing unit detachably secured to the engine unit support wherein the bearing blocks and bearing caps are connectable to form said main bearing units independently from the main bearing bolts, and wherein the crankcase is provided with an aperture below the crankshaft closed by at least one detachable cover part providing access to the main bearing bolts.

2. An internal combustion engine according to claim 1 wherein the bearing blocks and the bearing caps are connected to the main bearing units by means of mounting screws.

3. An internal combustion engine according to claim 1 wherein the detachable cover part is an oil pan. wherein in the region of the main bearing caps on both sides of the engine unit support at least one elastic supporting element is detachably and adjustably secured to the crankcase, said supporting elements being connected to a bunch provided at each side of the main bearing cap and said bunches lying within the assembly aperture as seen in the direction of the crankshaft axis.

4. An internal combustion engine according to claim 3 wherein the crankcase is provided at the side of the flywheel with an assembly aperture for the crankshaft and the main bearing units mounted thereon, and wherein a joint plane is provided below said assembly aperture for attachment of the oil pan.

5. An internal combustion engine according to claim 1, the crankcase being connected to the engine unit support by means of at least one resonance-absorbing elastic member wherein in the region of the main bearing caps on both sides of the engine unit support at least one elastic supporting element is detachably and adjustably secured to the crankcase, said supporting elements being connected to a bunch provided at each side of the main bearing cap and said bunches lying within the assembly aperture as seen in the direction of the crankshaft axis.

* * * * *